United States Patent [19]

Torbus et al.

[11] 4,301,271
[45] Nov. 17, 1981

[54] POLYURETHANE-BASED BINDER, AS WELL AS THE PRODUCTION THEREOF

[75] Inventors: Marek Torbus, Düsseldorf; Aleksandar Vujevic, Ratingen, both of Fed. Rep. of Germany

[73] Assignee: Hüttenes-Albertus Chemische Werke GmbH, Düsseldorf, Fed. Rep. of Germany

[21] Appl. No.: 159,769

[22] Filed: Jun. 16, 1980

[30] Foreign Application Priority Data

Jun. 23, 1979 [DE] Fed. Rep. of Germany ....... 2925733

[51] Int. Cl.$^3$ ............................................. C08G 18/32
[52] U.S. Cl. ...................................................... 528/85
[58] Field of Search ........................................ 528/85

[56] References Cited

U.S. PATENT DOCUMENTS

| 3,925,296 | 12/1975 | Stone et al. | 528/85 |
| 3,933,727 | 1/1976 | Schmid | 528/85 |
| 4,079,031 | 3/1978 | Sandessai et al. | 528/85 |

Primary Examiner—Maurice J. Welsh
Attorney, Agent, or Firm—Manfred M. Warren; Robert B. Chickering; Glen R. Grunewald

[57] ABSTRACT

A cold setting molding material which includes sand and a polyurethane binder with the polyol portion of the polyurethane reaction mixture containing a tertiary amino group and phenolic hydroxyl groups.

5 Claims, 1 Drawing Figure

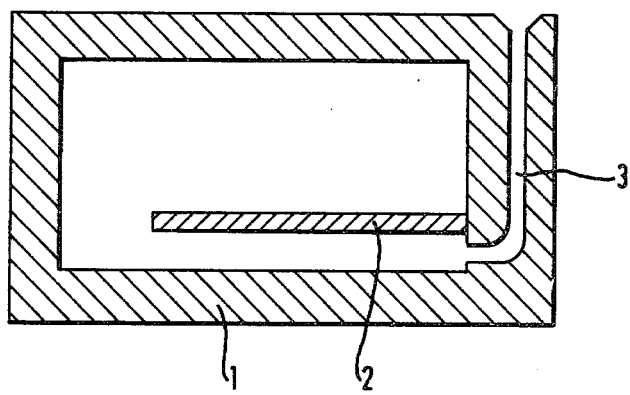

POLYURETHANE-BASED BINDER, AS WELL AS THE PRODUCTION THEREOF

BACKGROUND OF THE INVENTION

Increasing importance is being attached to the cold-setting polyurethane-based binders in connection with binder-containing moulding material mixtures for producing moulds and cores. These binders generally result from the reaction of polyisocyanates with at least 2 NCO groups and polyols with at least 2 OH groups.

In the foundry industry, the polyurethane binder is most frequently used in the form of a three-component system. For this purpose, generally the granular mould base material (e.g. quartz sand or the like) is initially mixed with the polyol (e.g. a phenol resin having a benzyl ether-like construction) and then with the polyisocyanate and subsequently reaction accelerators (e.g. tertiary amines or organometallic compounds) are added so that the binder sets in a sufficiently short time. This addition of reaction accelerators can take place in the final phase of the mixing process or after the moulding material mixture has been removed from the mould by briefly gasing the mixture in the mould with a gaseous tertiary amine such as e.g. triethyl amine (gas hardening process).

All known three-component systems have the disadvantage that the moulded blanks only relatively slowly acquire their final strength or at least a strength adequate for the production of high quality castings, so that it is necessary to intermediately store them for a relatively long time after removal from the mould.

The gas hardening process has the additional disadvantage that an additional process stage is involved, which is very costly from the apparatus standpoint, so that workers do not suffer from the toxic and extremely evil-smelling amines.

Belgian Pat. No. 865,741 already discloses a polyurethane binder for foundry purposes, which is used as a two-component system. In this binder, the polyol is an aminopolyol which, in addition to its OH groups, contains at least one tertiary amino group in the molecule which acts as an accelerator. As a result of this special molecule structure, the binder can be set or hardened very rapidly and uniformly without it being necessary to add additional accelerators. As a result, it is possible to use the moulded blanks after they have been stored for a much shorter time and the disadvantages of the known three-component systems are completely eliminated.

In the two-component binders known from Belgian Pat. No. 865,741, the aminopolyol is produced by reacting alkylene oxides with polyvalent primary or secondary aliphatic amines. These binders have proved eminently suitable, e.g. for light metal castings. However, it has been proved disadvantageous that they are less suitable for metals with a very high casting temperature such as e.g. grey cast iron, steel, etc. Thus, they have a somewhat thermoplastic nature and consequently do not have an optimum thermal stability, so that casting defects can occur at higher casting temperatures above about 1000° C. As a result of working with alkylene oxides, their production is correspondingly costly and difficult.

It is the object of the present invention to provide a cold-setting polyurethane binder representing a two-component system with an aminopolyol as one component which combines the advantage attainable with this system of a rapid possibility of using the moulded blanks, with a considerably improved thermal stability.

SUMMARY OF THE INVENTION

According to the invention, this is achieved in that the aminopolyol is a reaction product of phenolic compounds having at least two acid hydrogenatoms, with formaldehyde as well as primary or secondary aliphatic amines.

Thus, according to the invention, the aminopolyol is produced by α-aminoalkylation in the manner of a Mannich reaction according to the basic diagram

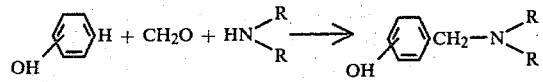

This is a much simpler and more problem-free production process than the reaction of amines with alkylene oxides known from Belgian Pat. No. 865,741. Furthermore, the invention also leads to a product, whose structure and characteristics differ from the known aminopolyol according to Belgian Pat. No. 865,841. In particular, it contains phenolic OH groups, whereas the known aminopolyol only has aliphatic bonded OH groups (because aromatic amines cannot be reacted in the necessary manner with alkylene oxides).

It has been found that the aminopolyol according to the invention is suitable as a component for a two-component system and leads to a binder which, with respect to the time before the moulded blanks can be used, brings the same advantages as the binder with the known aminopolyol according to Belgian Pat. No. 865,741. It has proved particularly surprising that a binder which contains the aminopolyol according to the invention no longer has thermoplastic properties and has an excellent thermostability permitting without difficulty usage for cores and moulds for grey cast iron, steel and similar metals with casting temperatures over 1300° C. Thus, the invention completely achieves the sought objectives.

The phenolic compounds which can be used for producing the aminopolyol according to the invention must contain at least two acid hydrogen atoms. Examples, either alone or mixed with one another, are phenol, m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-phenyl phenol, p-amyl phenol, p-octyl phenol, p-cyclohexyl phenol, 3,5-dimethoxy phenol, p-ethoxy phenol, p-butoxy phenol, p-phenoxy phenol, as well as bisphenols such as bisphenol A and bisphenol B. Their polycondensation products (precondensates) with aldehyde such as e.g. formaldehyde, acetaldehyde, propionaldehyde, furfural, etc. are also suitable, particularly if they also have terminal methylol type groups. In the case of such precondensates, the individual phenolic nuclei are generally interconnected via methylene bridges or dimethylene ether bridges.

The amines used for producing the aminopolyol according to the invention are primary and secondary aliphatic amines and polyamines and/or their salts, which can be used individually or as mixtures of various compounds. Particular preference for this purpose is given to those amines which also have OH functions, such as e.g. monoethanol amine, monoethyl ethanol amine, dimethyl ethanolamine, aminoethyl ethanolamine, diethyl ethanol amine, diethanolamine, monoisopropanol amine, diisopropanol amine, 3-amino propanol and 3,methyl-3-amino-1-butanol and/or their salts. In this way, additional OH groups are introduced into the aminopolyol chains linked to the nitrogen. It is particularly advantageous for these additional OH groups to be primary (i.e. terminal) OH groups, which are more reactive than e.g. secondary OH groups. When producing the known aminopolyol according to Belgian Pat. No. 865,741 by reacting alkylene oxides with amines, only secondary OH groups are formed in the end product.

The third reagent, i.e. formaldehyde is used in the form of its aqueous solution for its polymers (trioxan, paraformaldehyde).

In order to produce the aminopolyol according to the invention, it is merely necessary to bring the three reagents together, i.e. the phenolic compound, the amine and the formaldehyde, optionally in solution and to condense them until a resinous product is obtained after distilling off the reaction water formed. The molar ratios of the reagents are appropriately in the range 1 to 10 mol of phenolic compound to 2 to 20 mol of amine and 2 to 20mol of formaldehyde. The condensation time is 0.1 to 24 hours and is somewhat dependent on the temperature and the pressure. The end product can be dehydrated without any difficulty, so that its water content can be reduced to below 2%. In any case, the reaction should be performed in such a way that as fas as possible all amino groups of the amine used are converted into the tertiary structure.

The molecule size of the aminopolyol according to the invention is not particularly critical and is in principle only limited by the requirement that the aminopolyol must be soluble in conventional solvents, because it is generally used in the form of a solution in an organic solvent. Aromatic solvents of the solvent naphtha type are particularly suitable and in particular those with an aromatic substance content of at least 75% and a boiling range of 110° to 250° C. However, since the solubility of the aminopolyol in aromatic substances is somewhat dependent on its structure and in particular its OH number, it is sometimes necessary to dilute the aromatic solvents with polar solvents. Suitable polar solvents for this purpose are high-boiling alcohols, aldehydes, ketones and esters such as e.g. furfuryl alcohol, furfural, diacetone alcohol, cylcohexanone, diisopropyl ketone, methylisoamyl ketone, ethyl amyl ketone, isophorone, n-butyl acetate, isobutyl acetate, methyl glycol acetate, butyl glycol acetate, linalyl acetate, 4-tert.-butylcyclohexyl acetate, trimethyl pentane diol monoisobutyrate, dimethyl phthalate, diethyl phthalate, dibutyl phthalate, dioctyl phthalate, etc. The group of very high-boiling esters (with a boiling range of well above 200° C./20 torr) is very suitable for solvent purposes and includes e.g. bis-(2-ethylhexyl)-adipate, di-n-nonyl- and di-isononyladipate, di-n-octyl- and di-isooctyl-adipate, di-n-decyl and di-isodecyl-adipate, bis-(methylcyclohexyl)-adipate, bis-(methylcyclohexylmethyl)-adipate, benzyl-octyl-adipate, bis-(butoxyethyl)-adipate, di-n-hexyl-azelainate, tetracis-(2-ethylhexyl)-pyromellitate, tris-isooctyltrimellitate, tris-octyl-trimellitate, bis-2-ethylhexylsebacate, di-n-octyl-sebacate, di-n-hexyl-sebacate, as well as esters of alcoholic mixtures such as tri-$nC_8$-$C_{10}$-trimellitate and Di-$nC_7$-$C_9$-adipate, It is obvious that all the solvents can be used singly or mixed together.

The solvent quantity used must be sufficient to give a binder which ensures a uniform enveloping of the grains of the mould base material, a good fluidity of the moulding material mixture in the intial phase, i.e. in the mould and core model filling phase and a uniform sitting reaction of the moulding material mixture. The suitable solvent quantity represents 20 to 80% of the binder components.

All aliphatic, cycloaliphatic, arylaliphatic, aromatic or heterocyclic polyisocyanates with at least 2 NCO groups generally used for producing polyurethane resins can be used as polyisocyanates for the purpose of the invention. Examples of these are diphenyl methane-4,4'-diisocyanate, phenylenediisocyanate-(1,4), 2,2',6,6'-tetramethyl-diphenyl-methane-4,4'-diisocyanate, diphenyl dimethyl methane-4,4'-diisocyanate, maphthalene-1,5-diisocyanate, 2,4-toluene diisocyanate and 2,6-toluene diisocyanate or their isomeric mixtures, diphenyl-4,4'-diisocyanate, triphenyl-4,4',4''-triisocyanate, hexane-1,6-diisocyanate, cyclohexyl phenyl methane-4,4'-disocyanate, m-xylene diisocyanate, p-xylene diisocyanate, cyclohexane-1,4-diisocyanate, diphenyl ether-4,4'-diisocyanate, or their halogen-substituted derivatives. Preference is given to polyisocyanates with an aromatic structure. Mixtures of different polyisocyanates in the same structure have proved particularly suitable and examples of these are commercial phenyl methane diisocyanate raw materials. I is also possible to use prepolymers of polyhydric alcohols with polyisocyanates, provided that they have free isocyanate groups.

The polyisocyanate component is advantageously also used in an organic solvent, preferably in aromatic substances, e.g. of the solvent naphtha type. The polyisocyanate concentration is advantageously in the range 50 to 95%.

The polyisocyanate quantity added to the moulding material mixture should suffice for a quantitative polyurethane formation and, depending on the type, is in the range 10% to 500% of the aminopolyol quantity. Preference is given to almost stoichiometric quantities based on the OH groups and NCO groups.

Hereinafter, the invention is explained relative to examples.

DETAILED DESCRIPTION OF THE INVENTION

EXAMPLE 1

A mixture of 180 g of p-tert.-butyl phenol, 200 g of 37% formaline and 105 g of monoethanol amine were heated in a closed boiler for 1½ hours at between 60° and 130° C., after which the reaction water was removed by distillation, This led to a resinous product in the form of an amino polyol. A 60% solution in solvent naphtha was prepared from this product and could be directly used as the binder component.

For producing a moulding material mixture, 50 g of this binder component and 50 g of an 80% solution of polymethylene-polyphenyl-polyisocyanate in solvent naphtha were mixed with 5 kg of washed and dried quartz sand, mixing taking place for 30 seconds in a laboratory high speed vibrating mixer. Moulded articles were produced from this moulding material mixture in accordance with DIN 52 401 and were then tested. The strength values are given in the following Table.

EXAMPLE 2

110 g of p-cresol, 180 g of 37% formaline and 200 g of diethanol amine were heated for 2 hours at 60° to 130° C. in a closed boiler. The reaction water was then removed by distillation. This led to a resinous product in the form of aminopolyol. A 60% solution in solvent naphtha was prepared from this product and could be used directly as the binder component.

Using this binder component, moulded articles were produced in the same way as in example 1. The strength values are also given in the following Table.

It can be seen that a moulded blank produced by using the aminopolyol according to the invention has the same rapid strength increase and therefore can be used just as rapidly as a blank produced with the known aminopolyol according to Belgian Pat. No. 865,741. There is also no difference between the invention and Belgian Pat. No. 865,741 in connection with the fact that the moulding material mixture has a very adequate processing time.

TABLE

| | Bending strength in N/cm² after | | | | | |
|---|---|---|---|---|---|---|
| | 5' | 10' | 15' | 30' | 60' | 24h |
| example 1 | — | 40 | 250 | 500 | 600 | 700 |
| example 2 | — | 30 | 160 | 380 | 550 | 700 |
| Belgian Patent 865 741 | | 40 | 270 | 520 | 670 | 720 |

However, the thermal stability of the moulded blanks produced by using the aminopolyol according to the invention is much higher than that of blanks produced with the known aminopolyol. This is illustrated by the casting test described hereinafter relative to the drawing.

A plurality of identical parallelepipeds 1 were produced using both the aminopolyol according to the above examples of the invention, as well as that known from Belgian Pat. No. 865,741. A plate-like core 2 was inserted in each of the parallelepipeds 1. The gate 3 opened out below the core 2. The moulds and cores were untreated i.e. they did not undergo any finishing process. In all cases, the metal cast was cast iron (GGL) at a temperature of 1350° C. The casting time was about 1 minute and the casting weight approximately 30 kg.

The castings were proved to be completely satisfactory when the moulds and core were made by using the amino polyol according to the invention. However, the moulds and cores produced by using the known aminopolyol had casting defects typical of a too low thermal stability of the binder. These defects consisted of deformation of the core (upward being bended due to lifts), penetration of the casting metal into the particle association of the core and the mould (penetration) leading to core cracks and washing off both in the core and mould (in the latter particularly in the pouring in system and in the vicinity of the gate) as well as attachment of the poured off moulding material to the casting.

We claim:

1. Cold-setting moulding material binder with a polyurethane base for moulding material mixtures for producing moulds and cores, comprising a polyisocyanate with at least two NCO groups in the molecule and an amino polyol containing at least two OH groups, as well as a tertiary amino group acting as the accelerator in the molecule, characterized in that the amino polyol contains phenolic OH groups.

2. Binder according to claim 1, characterized in that it additionally contains aliphatic chains which have terminal OH groups.

3. Process for the production of a binder according to one of the claims 1 or 2, characterized in that 1 to 10 mol of a phenolic compound having at least two acid hydrogen atoms are condensed together with 2 to 20 mol of formaldehyde and 2 to 20 mol of a primary or secondary aliphatic amine, optionally in the form of a salt and subsequently the reaction water formed is distilled off.

4. Process according to claim 3, characterised in that the amine used also contains OH groups, preferably primary OH grups.

5. Process according to claims 3 or 4, characterised in that as the phenolic compound a precondensate of a phenol with an aldehyde or ketone is used which contains terminal methylol groups.

* * * * *